United States Patent
Sudo et al.

(10) Patent No.: US 9,187,359 B2
(45) Date of Patent: Nov. 17, 2015

(54) METHOD OF EVALUATING SILICA POWDER, VITREOUS SILICA CRUCIBLE, AND METHOD OF MANUFACTURING VITREOUS SILICA CRUCIBLE

(75) Inventors: Toshiaki Sudo, Akita (JP); Hiroshi Kishi, Akita (JP)

(73) Assignee: SUMCO CORPORATION, Tokyo (JP)

( * ) Notice: Subject to any disclaimer, the term of this patent is extended or adjusted under 35 U.S.C. 154(b) by 1110 days.

(21) Appl. No.: 13/197,408

(22) Filed: Aug. 3, 2011

(65) Prior Publication Data

US 2012/0037069 A1  Feb. 16, 2012

(30) Foreign Application Priority Data

Aug. 12, 2010 (JP) ................................. 2010-180857
Jul. 15, 2011 (JP) ................................. 2011-156381

(51) Int. Cl.
*C30B 35/00* (2006.01)
*C03C 1/02* (2006.01)
*C03B 19/09* (2006.01)

(52) U.S. Cl.
CPC ................. *C03C 1/02* (2013.01); *C03B 19/095* (2013.01); *Y10T 117/1032* (2015.01)

(58) Field of Classification Search
USPC .......................................... 117/1, 2, 200, 201
See application file for complete search history.

(56) References Cited

U.S. PATENT DOCUMENTS

| | | | |
|---|---|---|---|
| 5,972,488 A * | 10/1999 | Nagata et al. | ............. 428/304.4 |
| 2004/0118208 A1 | 6/2004 | Kishi et al. | |
| 2010/0165347 A1 | 7/2010 | Shimazu et al. | |
| 2011/0256330 A1 | 10/2011 | Yamagata et al. | |

FOREIGN PATENT DOCUMENTS

| | | |
|---|---|---|
| EP | 1413652 A1 | 4/2004 |
| EP | 2202007 A1 | 6/2010 |
| JP | 08-012359 A | 1/1996 |
| JP | 2000-072589 A | 3/2000 |
| JP | 2001-261353 A | 9/2001 |
| JP | 2010-083690 A | 4/2010 |
| TW | 201119943 A | 6/2011 |

OTHER PUBLICATIONS

Taiwan Office Action, mailed Oct. 23, 2013, for Taiwan counterpart application No. 100128926.

(Continued)

*Primary Examiner* — Robert M Kunemund
(74) *Attorney, Agent, or Firm* — Law Office of Katsuhiro Arai

(57) ABSTRACT

The present invention provides a method of evaluating silica powder which, enables precise prediction of easiness of crystallization of a vitreous silica crucible. According to the present invention, provided is a method of evaluating silica powder including a sample preparation process for preparing a vitrified sample by fusing silica powder at a fusing temperature of 1700 to 1900 deg. C., followed by cooling; a sample heat treatment process for retaining the sample for 30 minutes or more at a temperature of 1400 to 1750 deg. C., followed by cooling; and a sample evaluation process for evaluating a state of opacification of the sample after the sample heat treatment process.

6 Claims, 2 Drawing Sheets

(56) References Cited

OTHER PUBLICATIONS

A Notice of Reasons for Refusal issued by Japanese Patent Office, mailed May 20, 2014, for Japanese counterpart application No. 2011-156381.

Extended European Search Report (EESR) mailed Nov. 24, 2011, issued in corresponding EP Application No. EP11176615.0 (8 pages).

* cited by examiner

Sample Preparation Process(S1)

Preparing Sample by Fusing Silica Powder at 1700 to 1900 deg. C

Sample Heat Treatment Process(S2)

Heat-Treating Sample at 1400 to 1750 deg. C for 30 min. or more

Sample Evaluation Process(S3)

Evaluating State of Opacification of Sample

Fig. 1

METHOD OF EVALUATING SILICA POWDER, VITREOUS SILICA CRUCIBLE, AND METHOD OF MANUFACTURING VITREOUS SILICA CRUCIBLE

CROSS-REFERENCE TO RELATED APPLICATION

This application is related to Japanese Patent Applications No. 2010-180857 filed on Aug. 12, 2010 and No. 2011-156381 filed on Jul. 15, 2011 whose priorities are claimed, and the disclosures of which are incorporated by reference in their entirety.

BACKGROUND OF THE INVENTION

1. Field of the Invention

The present invention relates to a method of evaluating silica powder, a vitreous silica crucible, and a method of manufacturing a vitreous silica crucible.

2. Description of the Related Art

A vitreous silica crucible used for pulling a silicon single crystal can be manufactured by the processes of (1) forming a silica powder layer by depositing, in a predetermined thickness, crystalline or amorphous silica powder on the inner surface (the bottom surface and the side surface) of a rotating mold having an bowl-shaped inner surface defining the outer shape of the vitreous silica, while rotating the mold, and (2) vitrifying the silica powder layer by heating and fusing the silica powder layer up to a temperature of 2000 to 2600 deg. C. by use of arc discharge, followed by cooling.

In pulling a silicon single crystal, the vitreous silica crucible is heated up to a temperature equal to or higher than the melting point of silicon (1420 deg. C.). When vitreous silica is heated up to such temperature, a portion of the vitreous silica is crystallized. Crystallized portion is easily peeled off. When the peeled-off crystal pieces drop and mix in silicon melt retained in the crucible, the crystal pieces are carried to a silicon single crystal by way of heat convection and so on. As a result, the pulled ingot is crystallized, and the single crystallization yield of the ingot deteriorates.

SUMMARY OF THE INVENTION

At present, in order to evaluate the easiness of crystallization of vitreous silica, chemical analysis of the material silica powder is commonly used. The problem of the crystallization is controlled by setting an upper limit on the impurity concentration of the silica powder. However, the impurity concentration of the silica powder and the easiness of crystallization is not necessarily linked. Thus, according to the conventional method, even when silica powder is analyzed, it is still not possible to precisely predict the easiness of crystallization of the vitreous silica obtained from the silica powder. Therefore, it is not possible to determine whether or not the vitreous silica is easily crystallized until a crucible is actually manufactured, and the crucible is used for pulling a silicon single crystal.

The present invention has been made in view of these circumstances, and provides a method of evaluating silica powder, which enables precise prediction of easiness of crystallization of a vitreous silica crucible.

According to the present invention, provided is a method of evaluating silica powder including a sample preparation process for preparing a vitrified sample by fusing silica powder at a fusing temperature of 1700 to 1900 deg. C., followed by cooling; a sample heat treatment process for retaining the sample for 30 minutes or more at a temperature of 1400 to 1750 deg. C., followed by cooling; and a sample evaluation process for evaluating a state of opacification of the sample after the sample heat treatment process.

The present inventors have found, through extensive research, that it is possible to predict the easiness of crystallization of vitreous silica obtained from silica powder used for the sample preparation, and thus it is possible to evaluate whether or not the silica powder is suitable for manufacturing a vitreous silica crucible, by preparing a vitreous silica sample at the above-mentioned fusing temperature, heat-treating the sample at the above-mentioned temperature and during the above-mentioned time, and checking a state of opacification of the sample after the heat treatment. Thus, the present invention is completed.

According to the present invention, it is possible to evaluate whether or not the silica powder is suitable more easily and precisely than the conventional technique where the impurity concentration in silica powder is measured.

BRIEF DESCRIPTION OF THE DRAWINGS

FIG. 1 is a flow chart for a method of evaluating silica powder according to the present embodiment.

DESCRIPTION OF THE PREFERRED EMBODIMENTS

Figure 2:
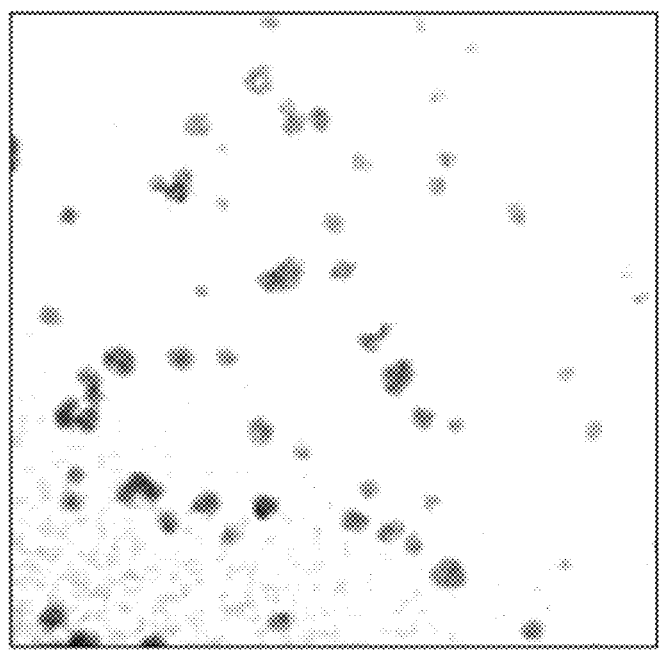
FIG. 2 is an example of a photomicrograph of a sample in which opaque spots appeared, according to an Example of the present invention.

As shown in FIG. 1, the method of evaluating silica powder according to one embodiment of the present invention includes a sample preparation process (S1) for preparing a vitrified sample by fusing silica powder at a fusing temperature of 1700 to 1900 deg. C., followed by cooling; a sample heat treatment process (S2) for retaining the sample for 30 minutes or more at a temperature of 1400 to 1750 deg. C., followed by cooling; and a sample evaluation process (S3) for evaluating a state of opacification of the sample after the sample heat treatment process.

1. Summary of the Present Invention

The present inventors prepared, by use of natural silica powder of a certain lot, plural samples with different fusing temperatures, and heat-treated these respective samples, followed by cooling. Before the heat treatment, all of these samples were transparent and they were indistinguishable from the appearance, but after the heat treatment, samples prepared at low fusing temperature were crystallized to produce many opaque spots therein. The number of the opaque spots decreased as the fusing temperature increased, and the opaque spot was not formed in the sample prepared at a temperature higher than a specific temperature (this specific temperature is called "opaque spot disappearing temperature"). The opaque spots look white in certain viewing conditions, and thus the opaque spots can also be referred to as "white spots".

The same experiments were performed with different lots. The same result was obtained in that the number of the opaque spots decreased as the fusing temperature in preparing the samples increased, but the opaque spot disappearing temperature was different. The difference of the opaque spot disappearing temperature indicates the difference of easiness of crystallization of the vitreous silica obtained from the silica powder. The more easily the vitreous silica is crystallized, the higher the opaque spot disappearing temperature becomes. Therefore, it is possible to determine whether a certain silica powder is suitable for manufacturing a vitreous silica crucible by checking whether the opaque spot disappearing temperature of the silica powder is a reference temperature or less. By use of this method, it is possible to evaluate whether or not the silica powder is suitable more easily and precisely than the conventional technique where the impurity concentration in the silica powder is measured. Furthermore, aside from the opaque spot disappearing temperature, the silica powder can be evaluated based on the temperature at which the sample is completely opacified or the temperature at which the number density of the opaque spots contained in the samples reaches a predetermined value (e.g. 10 pieces/cm$^3$).

In the above method, plural samples need to be prepared with different fusing temperatures for each lot. However, in another method, it is possible to evaluate silica powder by preparing one sample with a predetermined fusing temperature, heat-treating the sample in predetermined conditions, and thereafter measuring the number density of the opaque spots contained in the sample. The more easily the vitreous silica prepared from the silica powder is crystallized, the higher the number density of the opaque spots becomes. Thus, the number density of the opaque spots correlates with easiness of crystallization of the vitreous silica.

2. Explanation of Respective Processes (S1)

2-1. Sample Preparation Process (S1)

In the sample preparation process, a vitrified sampled is prepared by fusing silica powder at a fusing temperature of 1700 to 1900 deg. C., followed by cooling. The silica powder for preparing the sample can be either natural silica powder or synthetic silica powder.

Natural silica powder is silica powder manufactured by pulverizing natural mineral whose main component is a-quartz. Because the starting material of the natural silica powder is a natural product, and thus the nonuniformity of the properties between different lots is large. Therefore, it is in particular necessary to evaluate easiness of crystallization of the vitreous silica formed of natural silica powder. For example, it is possible to determine the difference in properties between different lots by evaluating silica powder from each lot in accordance with the method of the present embodiment. Then, for example, it is possible to reduce the nonuniformity of the properties of vitreous silica crucible manufactured by use of silica powder by setting criteria (e.g. the number density of the opaque spots after the heat treatment is 10/cm$^3$ or less), and using the criteria for shipping criteria of silica powder or criteria for delivery inspection.

Synthetic silica powder is silica powder manufactured by chemical synthesis, such as gas phase oxidation (dry synthesis) of silicon tetrachloride ($SiCl_4$), or hydrolysis (sol-gel method) of silicon alkoxide ($Si(OR)_4$). Synthetic silica powder is usually manufactured by use of high-purity synthetic raw material, and thus the purity thereof can be higher than natural silica powder. However, nonuniformity of chemical synthesis in the reaction chamber and nonuniformity in the firing process can cause nonuniformity of the properties of synthetic silica powder. Thus, it is possible to reduce the nonuniformity of the properties of vitreous silica crucible manufactured by use of silica powder by preparing plural samples from the same lot, and checking whether or not each of the samples satisfies criteria for shipping of silica powder or for delivery inspection.

Either natural silica powder or synthetic silica powder can be used as either non-doped silica powder or mineralizer-doped silica powder (i.e. silica powder doped with a mineralizer). Vitreous silica formed of the mineralizer-doped silica powder is more easily crystallized than that formed of non-doped silica powder, and thus the vitreous silica is used for the purpose of enhancing strength of a vitreous silica crucible during pulling a silicon ingot. The timing at which the silica powder is desired to be crystallized depends on the crucible size and the position (e.g. the inner surface side or the outer surface side of the crucible) of the mineralizer-doped vitreous silica layer. There is a tendency that the higher the mineralizer concentration of the vitreous silica is, the earlier the vitreous silica is crystallized. However, it is not easy to specifically investigate the relationship between the kind and concentration of the mineralizer and the easiness of crystallization, and the evaluation method was not established in the prior art.

The method of the present embodiment can be used in order to investigate the relationship between the concentration of the mineralizer added to the silica powder and the easiness of crystallization of the vitreous silica formed of the silica powder. For example, it is possible to determine the relationship between the concentration of the mineralizer and the easiness of crystallization of the vitreous silica by preparing plural samples from plural kinds of silica powder which are different in the mineralizer concentration, and measuring the number density of the opaque spots of the samples after heat-treating the samples in the same conditions. By use of this relationship, it is possible to determine how the mineralizer concentration needs to be changed when the easiness of crystallization is desired to be enhanced.

Furthermore, when the kind of the mineralizer changes, the concentration thereof and the easiness of crystallization of the vitreous silica also changes. According to the method of the present embodiment, it is possible to determine the relationship between the kind of the mineralizer and the easiness of crystallization of the vitreous silica by preparing plural samples from plural kinds of silica powder which are different in the kind of the mineralizer, and measuring the number density of the opaque spots of the samples after heat-treating the samples in the same conditions.

The kind of the mineralizer added to silica powder is not in particular limited as long as the mineralizer promotes crystallization of the vitreous silica. The kind of the mineralizer is preferably metal impurities, because metal impurities particularly promote crystallization. The kind of the mineralizer is, for example, alkali metal (e.g. sodium or potassium), alkali earth metal (magnesium, calcium, strontium, or barium), aluminium, iron. The mineralizer can be added to silica powder, for example, by mixing silica powder with alkoxide of a mineralizer, followed by firing at a temperature of 600 deg. C. to 1100 deg. C. to attach the mineralizer to the surface of the silica powder.

The fusing temperature of silica powder is 1700 to 1900 deg. C., and preferably, 1750 to 1800 deg. C. When the fusing temperature is below 1700 deg. C., the silica powder is difficult to be vitrified. When the fusing temperature is above 1900 deg. C., opaque spots do not come out even after the heat treatment. Therefore, the fusing temperature for preparing samples for the evaluation method of the present embodiment is 1700 to 1900 deg. C. Furthermore, the fusing temperature is preferably 1750 to 1800 deg. C. because the number density of the opaque spots largely changes in the range between 1750 to 1800 deg. C. The fusing temperature is, for example, 1700, 1750, 1800, 1850, 1900 deg. C., and can be in the range between any two values of the values exemplified here.

Silica powder can be fused, for example, by supplying silica powder in a sample container for evaluation, and placing the sample container in a temperature-controllable heating apparatus, followed by heating up to the fusing temperature. The sample container after the fusion can be cooled, for example, by switching off the heating apparatus, and leaving the container in the heating apparatus until the container becomes the room temperature. Furthermore, in order to cool the container more quickly, the container can be forcedly cooled by use of a fan and so on.

2-2. Sample Heat Treatment Process (S2)

In the sample heat treatment process (S2), the sample prepared in the sample preparation process is retained at 1400 to 1750 deg. C. for 30 minutes or more, followed by cooling.

The sample before the heat treatment process is transparent irrespective of the fusing temperature, and it is not possible to judge whether or not the sample is easy to be crystallized from the appearance. The present process heat-treats the sample at 1400 to 1750 deg. C. for 30 minutes or more to promote opacification of the sample. If the sample is easy to be crystallized, the entire sample is opacified by the heat treatment. However, if the sample is more difficult to be crystallized, opaque spots appear in the sample, and if the sample is even more difficult to be crystallized, the sample is not crystallized by the heat treatment and remains transparent. The more easily the sample is crystallized, the higher the number density of the opaque spots is. Thus, easiness of crystallization of the sample can be determined based on the number density of the opaque spots.

The temperature of the heat treatment is 1400 to 1750 deg. C. When the temperature is below 1400 deg. C. or above 1750 deg. C., the vitreous silica is difficult to be opacified, and thus such temperature is not preferable as the temperature for the heat treatment in the method of evaluating silica powder according to the present embodiment. In order to promote opacification, it is necessary to retain the high temperature at least for 30 minutes. Therefore, the heat treatment conditions are at 1400 to 1750 deg. C. for 30 minutes. The heat treatment temperature is, for example, 1400, 1450, 1500, 1550, 1600, 1650, 1700, 1750 deg. C., and can be in the range between two values of the values exemplified here. Furthermore, when the heat treatment time is longer than necessary, it takes longer time to perform the evaluation method of the present embodiment, and thus is inefficient. Thus, the heat treatment time is preferably 10 hours or less. The heat treatment time is, for example, 30 minutes, 1 hour, 2 hours, 4 hours, 6 hours, 8 hours, 10 hours, and can be in the range between two values of the values exemplified here.

The heat treatment process can be performed by placing the sample in a temperature-controllable heating apparatus, heating the sample to the heat treatment temperature, and retaining the sample at the heat treatment temperature for a predetermined period, followed by cooling. The sample can be cooled, for example, by switching off the heating apparatus, and leaving the container in the heating apparatus until the container becomes the room temperature. Furthermore, in order to cool the container more quickly, the container can be forcedly cooled by use of a fan and so on.

The heat treatment process can be performed only once, but can be performed again in case no opaque spots are formed in the sample after the heat treatment.

2-3. Sample Evaluation Process (S3)

In the sample evaluation process (S3), a state of opacification of the sample after the sample heat treatment process is evaluated. "Evaluating a state of opacification of the sample" means "to judge how much the sample is opacified". Then, based on the judgment result, it is judged whether or not the silica powder at issue has desired properties.

As a result of the judgment, if the delivered silica powder does not have properties suitable for manufacturing a vitreous silica crucible, the silica powder may be returned, and if the easiness of crystallization of vitreous silica formed from mineralizer-doped silica powder is insufficient, the dope amount of the mineralizer may be increased.

The evaluation of the sample can be performed by preparing one sample at a predetermined fusing temperature, heat-treating the sample in predetermined conditions, and thereafter measuring the number density of the opaque spots contained in the sample. This method is advantageous in that it is not necessary to prepare a large number of samples. The method of measuring the number density is, for example, a method of dividing the total number of the opaque spots in the sample by the volume of the sample, or a method of counting the number of the opaque spots contained in a unit volume of the sample.

The evaluation of the sample may be performed by preparing plural samples with different fusing temperatures, heat-treating the samples, and determining the fusing temperature at which opacification of the sample becomes a predetermined state (a state where there is no opaque spot, a state where the number density of the opaque spots is in a predetermined range, or a state where the entire sample is opacified). This method is advantageous in that it is not necessary to accurately measure the number density of the opaque spots of the sample.

According to the method of evaluating silica powder according to the present embodiment, unlike the conventional method, it is not necessary to analyze impurity concentration, and thus an expensive apparatus is not necessary. In addition, it is possible to evaluate silica powder with higher accuracy than the conventional method.

3. Method of Manufacturing Vitreous Silica Crucible

A method of manufacturing a vitreous silica crucible according to the present embodiment includes a silica powder evaluation process for evaluating silica powder by the above-mentioned method of evaluating silica powder, and a vitreous silica layer formation process for forming a vitreous silica layer by fusing the silica powder after the evaluation, followed by cooling.

The vitreous silica crucible can be manufactured by the processes of (1) forming a silica powder layer for a vitreous silica layer by depositing, in a predetermined thickness, crystalline or amorphous silica powder on the inner surface (the bottom surface and the side surface) of a rotating mold having an bowl-shaped inner surface defining the outer shape of the vitreous silica, while rotating the mold, and (2) vitrifying the silica powder layer by heating and fusing the silica powder layer up to a temperature of 2000 to 2600 deg. C. by use of arc discharge, followed by cooling. When the deposited silica powder does not meet the quality criteria, the quality of the vitreous silica crucible manufactured by use of the silica powder can deteriorate. Therefore, in the method of manufacturing a vitreous silica crucible of the present embodiment, silica powder used for manufacturing the vitreous silica crucible is first evaluated by the above-mentioned evaluation method, and when the silica powder meets the quality criteria, the silica powder is fused for manufacturing a vitreous silica crucible. According to the method of the present embodiment, it is possible to improve the quality of the manufactured vitreous silica crucible.

Example

1. Influence of Fusing Temperature on Opacification of Sample

Natural silica powder (Lot 1) was filled in a sample container having a diameter of 6 cm and a depth of 10 cm, and the sample container with the powder was placed in a heating apparatus for heat treatment at a temperature shown in Table 1, and then the heating apparatus was switched off for natural cooling to the room temperature, to obtain a sample for evaluation. The obtained sample was heat-treated by use of the same heating apparatus at a temperature and time shown in Table 1, and then the heating apparatus was switched off for natural cooling to the room temperature. Thereafter, the sample was taken out of the heating apparatus, and the number density of the opaque spots was measured. The result is shown in Table 1. Furthermore, the same evaluation was performed by use of another natural silica powder (Lot 2). The result is also shown in Table 1.

The number density of the opaque spots was measured in the following way. First, a vitreous silica plate with a thickness of about 5 mm was cut out from the vitreous silica sample with a diameter of 6 cm prepared by fusing silica powder, and then the surface of the vitreous silica plate was polished so that light can transmit through the plate or does not scatter on the surface. Thereafter, the number density of the opaque spots was measured by use of an optical microscope whose light source is a halogen lamp. The measurement was performed in the following way. (1) A microruler with a pitch of 0.1 mm was photographed with the same magnification as in photographing the silica glass plate. The size of the opaque spot was determined with reference to the photographed microruler. (2) Then, the area of the visual field for observation was calculated. (3) Then, the focus of the microscope was moved from the front-side surface to the back-side surface of the vitreous silica plate, and some photographs were taken along the way to observe a state of the opaque spots of the surface and the inside of the vitreous silica plate, and the number of the opaque spots in the photographs was counted. In the counting, only an opaque spot whose circumradius is over 10 μm was taken into account. One example of the photograph is shown in FIG. 2. Opaque spots which are out of focus do not appear in the photograph, and thus the opaque spot existing in the inside of the vitreous silica plate can be counted. (4) The number density of the opaque spots were calculated based on the thickness, the area, and the number of the opaque spots of the measured portion, The meaning of "A" to "E" in the column of "Number Density of Opaque spots" in Table 1 is as follows.
A: No opaque spot
B: The number density of the opaque spots is 1 to 10/cm$^3$.
C: The number density of the opaque spots is 11 to 50/cm$^3$.
D: The number density of the opaque spots is 51/cm$^3$ or more, but the entire sample is not opacified.
E: The entire sample is opacified.

TABLE 1

| | Sample | Fusing Temperature (Deg. C.) | Heat Treatment Temperature (Deg. C.) | Heat Treatment Time (min.) | Number Density of Opaque Spots |
|---|---|---|---|---|---|
| Lot 1 | 1 | 1770 | 1500 | 60 | E |
| Lot 1 | 2 | 1780 | 1500 | 60 | C |
| Lot 1 | 3 | 1790 | 1500 | 60 | A |
| Lot 1 | 4 | 1800 | 1500 | 60 | A |
| Lot 2 | 5 | 1770 | 1500 | 60 | E |
| Lot 2 | 6 | 1780 | 1500 | 60 | D |
| Lot 2 | 7 | 1790 | 1500 | 60 | C |
| Lot 2 | 8 | 1800 | 1500 | 60 | A |

With reference to Table 1, for Lot 1, when the fusing temperature was 1790 deg. C. or more, opaque spots did not appear, but when the fusing temperature was lower than that, opaque spots appeared. In contrast, for Lot 2, when the fusing temperature was 1800 deg. C. or more, opaque spots did not appear, but when the fusing temperature was lower than that, opaque spots appeared. The opaque spots are presumed to spots of crystallized vitreous silica, and a vitreous silica crucible produced from the silica powder in Lot 2 was more easily crystallized in pulling a silicon ingot.

This result indicates that the silica powder of Lot 2 is more easily crystallized, and thus this silica powder of Lot 1 is higher in quality than the silica powder of Lot 2 as material of vitreous silica when crystallization of the vitreous silica is not desired.

2. Influence of Mineralizer Concentration on Opacification of Sample

Synthetic silica powder doped with a mineralizer as shown in Table 2 was filled in a sample container having a diameter of 6 cm and a depth of 10 cm, and the sample container with the powder was placed in a heating apparatus for heat treatment at a temperature shown in Table 2, and then the heating apparatus was switched off for natural cooling to the room temperature, to obtain a sample for evaluation. The obtained sample was heat-treated by use of the same heating apparatus at a temperature and time shown in Table 2, and then the heating apparatus was switched off for natural cooling to the room temperature. Thereafter, the sample was taken out of the heating apparatus, and the number density of the opaque spots was measured. The result is shown in Table 2. The meaning of "A" to "E" in the column of "Number Density of Opaque spots" in Table 2 is as mentioned above.

TABLE 2

| Sample | Mineralizer | Mineralizer Concentration (ppm) | Fusing Temperature (Deg. C.) | Heat Treatment Temperature (Deg. C.) | Heat Treatment Time (min.) | Number Density of Opaque Spots |
|---|---|---|---|---|---|---|
| 9 | Al | 20 | 1790 | 1500 | 60 | A |
| 10 | Al | 30 | 1790 | 1500 | 60 | B |
| 11 | Al | 40 | 1790 | 1500 | 60 | C |
| 12 | Al | 50 | 1790 | 1500 | 60 | D |
| 13 | Al | 100 | 1790 | 1500 | 60 | E |
| 14 | Ba | 20 | 1790 | 1500 | 60 | B |
| 15 | Ba | 30 | 1790 | 1500 | 60 | C |
| 16 | Ba | 40 | 1790 | 1500 | 60 | D |
| 17 | Ba | 50 | 1790 | 1500 | 60 | E |
| 18 | Ba | 100 | 1790 | 1500 | 60 | E |

With reference to Table 2, when the fusing temperature and the heat treatment conditions are the same for different samples, the difference in the mineralizer concentration changes the number density of the opaque spots which appear in the samples after the heat treatment. This result is useful in determining the mineralizer concentration of silica powder when the silica powder is used for vitreous silica which is desired to be crystallized. Furthermore, it was found that the difference in the kind of the mineralizer changes the number density of the opaque spots (easiness of crystallization).

What is claimed is:

1. A method of evaluating silica powder comprising:
    a sample preparation process for preparing a transparent vitrified sample by fusing silica powder at a fusing temperature of 1780 to 1790 deg. C, followed by cooling;
    a sample heat treatment process for retaining the sample for 30 minutes or more at a temperature of 1400 to 1750 deg. C, followed by cooling; and
    a sample evaluation process for evaluating the silica powder according to a state of opacification of the sample after the sample heat treatment process, wherein the state of opacification is accessed by measuring the number density of opaque spots contained in the sample.

2. The method of claim 1, wherein, in the sample preparation process, plural samples are prepared at different fusing temperatures, and in the sample evaluation process, the state of opacification of the sample is evaluated by a density of opaque spots contained in the sample.

3. The method of claim 1, wherein the silica powder is natural silica powder.

4. The method of claim 1, wherein the silica powder is silica powder doped with a mineralizer.

5. A vitreous silica crucible having a vitreous silica layer obtained by fusing silica powder, followed by cooling, wherein the silica powder is silica powder, the state of opacification of which has been evaluated according to the method of claim 1.

6. A method of manufacturing a vitreous silica crucible comprising the processes of:
    a silica powder evaluation process for evaluating silica powder by the method of claim 1,
    a vitreous silica layer formation process for forming a vitreous silica layer by fusing the silica powder after the evaluation, followed by cooling.

* * * * *